US011570386B2

(12) United States Patent
Shin et al.

(10) Patent No.: US 11,570,386 B2
(45) Date of Patent: Jan. 31, 2023

(54) IMAGE SENSING DEVICE AND OPERATING METHOD THEREOF

(71) Applicant: SK hynix Inc., Gyeonggi-do (KR)

(72) Inventors: Jung Soon Shin, Gyeonggi-do (KR); Nam Ryeol Kim, Gyeonggi-do (KR); Yu Jin Park, Gyeonggi-do (KR); Kang Bong Seo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 23 days.

(21) Appl. No.: 17/211,268

(22) Filed: Mar. 24, 2021

(65) Prior Publication Data
US 2022/0124266 A1    Apr. 21, 2022

(30) Foreign Application Priority Data
Oct. 19, 2020 (KR) .................. 10-2020-0135240

(51) Int. Cl.
*H04N 5/355* (2011.01)
*H04N 5/374* (2011.01)
*H04N 5/343* (2011.01)
*H01L 27/146* (2006.01)
*H04N 5/3745* (2011.01)

(52) U.S. Cl.
CPC ......... *H04N 5/3559* (2013.01); *H04N 5/3745* (2013.01)

(58) Field of Classification Search
CPC .... H04N 5/3559; H04N 5/3745; H04N 5/378; H04N 5/343; H01L 17/14641; H01L 27/14643; H01L 27/14603; H01L 27/14612
See application file for complete search history.

(56) References Cited

U.S. PATENT DOCUMENTS

| 9,343,500 | B2 | 5/2016 | Mabuchi |
| 9,992,417 | B2 | 6/2018 | Okura et al. |
| 10,116,892 | B1 * | 10/2018 | Wang ............... H04N 5/378 |
| 10,290,673 | B1 * | 5/2019 | Wang ............ H04N 5/23241 |
| 11,140,343 | B1 * | 1/2021 | Ramakrisnan ....... H04N 5/3698 |
| 2014/0078368 | A1 * | 3/2014 | Komori ............... H04N 5/3742 |
| | | | 348/307 |

(Continued)

FOREIGN PATENT DOCUMENTS

KR    10-0937320    1/2010

OTHER PUBLICATIONS

Takayanagi et al., An 87dB Single Exposure Dynamic Range CMOS Image Sensor with a 3.0 μm Triple Conversion Gain Pixel, 2017 Papers, 2017, p. 274-p. 277, Session 07, IISS.

(Continued)

*Primary Examiner* — Marly S Camargo
(74) *Attorney, Agent, or Firm* — IP & T Group LLP

(57) ABSTRACT

Disclosed is an image sensing device and an operating method thereof, and the image sensing device may include a first unit pixel circuit disposed in a first row, including a first floating diffusion node, and suitable for outputting a first pixel signal through a column line, a second unit pixel circuit disposed in a second row, including a second floating diffusion node, and suitable for outputting a second pixel signal through the column line, and a first coupling circuit suitable for selectively coupling the first floating diffusion node to the second floating diffusion node based on a first mode control signal.

16 Claims, 9 Drawing Sheets

(56) References Cited

U.S. PATENT DOCUMENTS

| | | | |
|---|---|---|---|
| 2017/0034411 A1* | 5/2017 | Okura | H04N 5/355 |
| 2020/0322553 A1* | 4/2020 | Shim | H04N 5/3559 |
| 2021/0075986 A1* | 3/2021 | Panicacci | H04N 5/378 |

OTHER PUBLICATIONS

Iida et al, A 0.68e-rms Random-Noise 121dB Dynamic-Range Sub-pixel architecture CMOS Image Sensor with LED Flicker Mitigation, 2018 IEEE International Electron Devices Meeting (IEDM), Dec. 2018, p. 10.2.1-10.2.4, IEEE, San Francisco, CA, USA.

Solhusvik et al., A 1280×960 2.8 µm HDR CIS with DCG and Split-Pixel Combined, 2019 Papers, 2019, Session 07, IISS.

Jang et al., 0.8 µm-pitch CMOS Image Sensor with Dual Conversion Gain Pixel for Mobile Applications, 2019 Papers, 2019, Session 01, IISS.

\* cited by examiner

IMAGE SENSING DEVICE AND OPERATING METHOD THEREOF

CROSS-REFERENCE TO RELATED APPLICATION(S)

This application claims priority under 35 U.S.C. § 119 to Korean Patent Application No. 10-2020-0135240, filed on Oct. 19, 2020, the disclosure of which is incorporated herein by reference in its entirety.

BACKGROUND

1. Field

Various embodiments of the present disclosure relate to a semiconductor design technique, and more particularly, to an image sensing device and an operating method thereof.

2. Description of the Related Art

Image sensing devices capture images using the property of a semiconductor which reacts to light. Generally, there are two types of image sensing devices: charge-coupled device (CCD) image sensing devices and complementary metal-oxide semiconductor (CMOS) image sensing devices. Recently, CMOS image sensing devices are widely used because the CMOS image sensing devices allow both analog and digital control circuits to be directly implemented on a single integrated circuit (IC).

SUMMARY

Various embodiments of the present disclosure are directed to an image sensing device capable of increasing per pixel charge capacity by using neighboring pixels, and an operating method of the image sensing device.

In addition, various embodiments of the present disclosure are directed to an image sensing device capable of controlling whether or not to increase charge capacity of a pixel according to a mode, while increasing the capacity by maximizing the use of neighboring pixels, and an operation method of the image sensing device.

In accordance with an embodiment, an image sensing device may include: a first unit pixel circuit disposed in a first row, including a first floating diffusion node, and suitable for outputting a first pixel signal through a column line; a second unit pixel circuit disposed in a second row, including a second floating diffusion node, and suitable for outputting a second pixel signal through the column line; and a first coupling circuit suitable for selectively coupling the first floating diffusion node to the second floating diffusion node based on a first mode control signal.

The first coupling circuit may electrically couple the first floating diffusion node to the second floating diffusion node during a low conversion gain period, and electrically isolate the first floating diffusion node from the second floating diffusion node during a high conversion gain period.

In accordance with an embodiment, an operating method of an image sensing device may include: electrically coupling, during a first frame time, a plurality of floating diffusion nodes included in a plurality of unit pixel circuits, respectively, and disposed in a column; and generating image data in accordance with a low conversion gain mode from any one of the plurality of unit pixel circuits during the first frame time.

The operating method of an image sensing device may further include: electrically isolating the plurality of floating diffusion nodes during a second frame time; and generating image data in accordance with a high conversion gain mode from any one of the plurality of unit pixel circuits.

In accordance with an embodiment, an operating method of an image sensing device may include: alternately operating each of a plurality of unit pixel circuits in a low conversion gain mode and a high conversion gain mode during a first frame time; and alternately generating, by each of the unit pixel circuits, image data in accordance with the low conversion gain mode and image data in accordance with the high conversion gain mode, during the first frame time.

The alternately operating may include electrically coupling a plurality of floating diffusion nodes, which are included in the plurality of unit pixel circuits, respectively, and disposed in a column, in the low conversion gain mode.

The alternately operating may include electrically isolating the plurality of floating diffusion nodes in the high conversion gain mode.

In accordance with an embodiment, an operating method of an image sensing device including a column of unit pixel circuits, each having a floating diffusion node, may include: generating first image data from one of the pixel circuits with electrically coupled floating diffusion nodes of neighboring pixel circuits; and generating second image data from one of the pixel circuits with electrically isolated floating diffusion nodes of neighboring pixel circuits.

DETAILED DESCRIPTION

Various embodiments are described in detail below with reference to the accompanying drawings to describe in detail the present disclosure to enable those skilled in art to which the present disclosure pertains to practice and easily carry out the present disclosure. Throughout the specification, reference to "an embodiment" or the like is not necessarily to only one embodiment, and different references to any such phrase are not necessarily to the same embodiment(s). The term "embodiments" when used herein does not necessarily refer to all embodiments.

Throughout the specification, when an element is referred to as being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" when used herein, specify the presence of the stated elements and do not preclude the presence or addition of one or more other elements. In the following description some components are described in the singular form, but the present disclosure is not limited thereto; it will be understood that components may be formed in plural.

Figure 1:
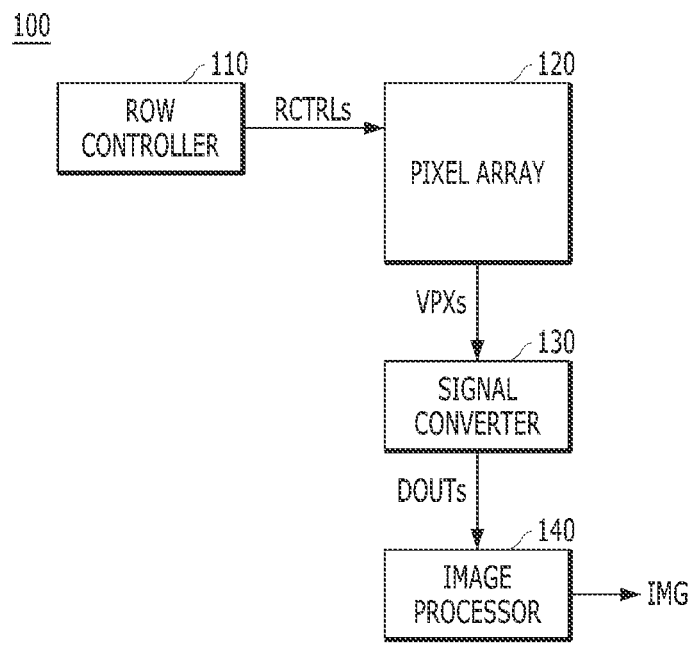
FIG. 1 is a block diagram illustrating an image sensing device in accordance with an embodiment.

FIG. 1 is a block diagram illustrating an image sensing device 100 in accordance with an embodiment.

Referring to FIG. 1, the image sensing device 100 may include a row controller 110, a pixel array 120, a signal converter 130 and an image processor 140.

The row controller 110 may generate a plurality of row control signals RCTRLs for controlling respective rows of the pixel array 120 during a frame time, that is, a single frame time. For example, the row controller 110 may generate first row control signals for controlling pixels arranged in a first row of the pixel array 120 during a first row line time of the frame time, and generate $n^{th}$ row control signals for controlling pixels arranged in an $n^{th}$ row of the pixel array 120 during an $n^{th}$ row line time of the frame time (where "n" is a natural number greater than 2). During the frame time, the row controller 110 may generate the plurality of row control signals RCTRLs according to a single mode that may be either a low conversion gain mode or a high conversion gain mode, or generate the plurality of row control signals RCTRLs according to a mixed mode including both the low and high conversion gain modes.

Figure 2:
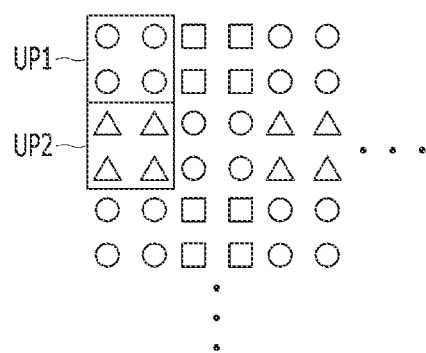
FIG. 2 is a diagram illustrating an example of a pixel array.

The pixel array 120 may include a plurality of pixels arranged at intersections of a plurality of rows and a plurality of columns. For example, the plurality of pixels may be arranged in a quad pattern, as shown in FIG. 2. The plurality of pixels may output a plurality of pixel signals VPXs for each row to the signal converter 130 under the control of the row controller 110. For example, the pixels arranged in the first row among the plurality of pixels may generate the plurality of pixel signals VPXs during the first row line time based on the first row control signals, and the pixels arranged in the $n^{th}$ row among the plurality of pixels may generate the plurality of pixel signals VPXs during the $n^{th}$ row line time based on the nth row control signals.

The signal converter 130 may generate a plurality of digital signals DOUTs corresponding to the plurality of pixel signals VPXs. Hereinafter, all of the plurality of digital signals DOUTs generated corresponding to all the rows, that is, the first to $n^{th}$ rows, during the frame time are referred to as image data. For example, the signal converter 130 may include an analog to digital converter (ADC).

The image processor 140 may generate an image IMG based on the plurality of digital signals DOUTs. For example, the image processor 140 may generate a high dynamic range image IMG based on at least one first image data generated according to the low conversion gain mode and at least one second image data generated according to the high conversion gain mode.

FIG. 2 is a diagram illustrating an example of the pixel array 120 illustrated in FIG. 1.

Referring to FIG. 2, the pixel array 120 may include the plurality of pixels arranged in the quad pattern. The quad pattern refers to a pattern in which pixels having the same color are arranged in units of 2×2. Hereinafter, a 2×2 unit pixel circuit UP1 arranged in a first row (which may collectively include first and second individual rows of pixels as shown in FIG. 2) and a first column (which may collectively include first and second individual columns as shown in FIG. 2) is referred to as a first unit pixel circuit, and a 2×2 unit pixel circuit UP2 arranged in a second row (which may collectively include third and fourth individual rows as shown in FIG. 2) and a first column (which may collectively include the first and second individual columns) is referred to as a second unit pixel circuit. In general, a 2×2 unit pixel includes any four adjacent pixels.

Figure 3:
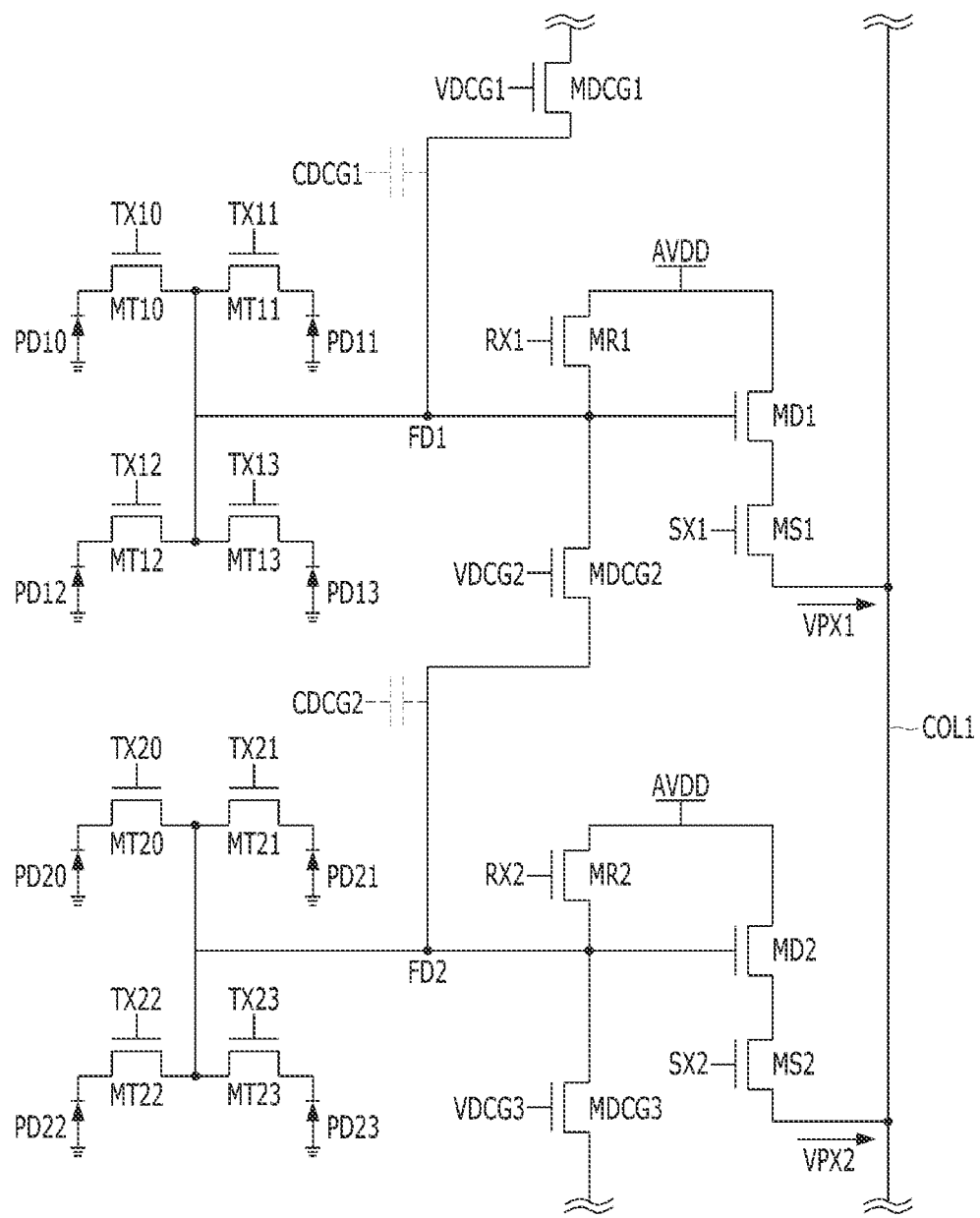
FIG. 3 is a circuit diagram illustrating first and second unit pixel circuits among a plurality of unit pixel circuits included in a pixel array and circuits related thereto.

FIG. 3 is a circuit diagram illustrating the first and second unit pixel circuits UP1 and UP2 illustrated in FIG. 2 and relevant circuits thereof, i.e., MDCG1, MDCG2, MDCG3, CDCG1, CDCG2 and COL1.

Referring to FIG. 3, the first unit pixel circuit UP1 may include first to fourth photodiodes PD10, PD11, PD12 and PD13, first to fourth transmission elements MT10, MT11, MT12 and MT13, a first floating diffusion node FD1, a first reset element MR1, a first driving element MD1 and a first selection element MS1.

The first unit pixel circuit UP1 may have a structure in which the first to fourth photodiodes PD10, PD11, PD12 and PD13 share the first floating diffusion node FD1, the first reset element MR1, the first driving element MD1 and the first selection element MS1.

The first photodiode PD10 may be coupled between a low voltage terminal, for example, a ground voltage terminal, and the first transmission element MT10. The second photodiode PD11 may be coupled between the low voltage terminal and the second transmission element MT11. The third photodiode PD12 may be coupled between the low voltage terminal and the third transmission element MT12. The fourth photodiode PD13 may be coupled between the low voltage terminal and the fourth transmission element MT13.

The first transmission element MT10 may be coupled between the first photodiode PD10 and the first floating diffusion node FD1. The first transmission element MT10 may selectively couple the first photodiode PD10 to the first floating diffusion node FD1 based on a first transmission control signal TX10 of the first row control signals. The second transmission element MT11 may be coupled between the second photodiode PD11 and the first floating diffusion node FD1. The second transmission element MT11 may selectively couple the second photodiode PD11 to the first floating diffusion node FD1 based on a second transmission control signal TX11 of the first row control signals. The third transmission element MT12 may be coupled between the third photodiode PD12 and the first floating diffusion node FD1. The third transmission element MT12 may selectively couple the third photodiode PD12 to the first floating diffusion node FD1 based on a third transmission control signal TX12 of the first row control signals. The fourth transmission element MT13 may be coupled between the fourth photodiode PD13 and the first floating diffusion node FD1. The fourth transmission element MT13 may selectively couple the fourth photodiode PD13 to the first floating diffusion node FD1 based on a fourth transmission control signal TX13 of the first row control signals.

Although not illustrated in the drawing, a first parasitic capacitor may be coupled to the first floating diffusion node FD1. The first parasitic capacitor may store charges generated from the first to fourth photodiodes PD10, PD11, PD12 and PD13.

The first reset element MR1 may be coupled between a high voltage terminal, for example, a power supply voltage terminal AVDD, and the first floating diffusion node FD1. The first reset element MR1 may selectively couple the high voltage terminal to the first floating diffusion node FD1 based on a first reset control signal RX1 of the first row control signals.

The first driving element MD1 may be coupled between the high voltage terminal and the first selection element MS1. The first driving element MD1 may drive a first pixel signal VPX1 based on a voltage loaded onto the first floating diffusion node FD1.

The first selection element MS1 may be coupled between the first driving element MD1 and a first column line COL1. The first selection element MS1 may output the first pixel signal VPX1 to the first column line COL1 based on a first selection control signal SX1 of the first row control signals.

The second unit pixel circuit UP2 may include fifth to eighth photodiodes PD20, PD21, PD22 and PD23, fifth to eighth transmission elements MT20, MT21, MT22 and MT23, and a second floating diffusion node FD2, a second reset element MR2, a second driving element MD2 and a second selection element MS2.

The second unit pixel circuit UP2 may have a structure in which the fifth to eighth photodiodes PD20, PD21, PD22 and PD23 share the second floating diffusion node FD2, the second reset element MR2, the second driving element MD2 and the second selection element MS2.

The fifth photodiode PD20 may be coupled between the low voltage terminal and the fifth transmission element MT20. The sixth photodiode PD21 may be coupled between the low voltage terminal and the sixth transmission element MT21. The seventh photodiode PD22 may be coupled between the low voltage terminal and the seventh transmission element MT22. The eighth photodiode PD23 may be coupled between the low voltage terminal and the eighth transmission element MT23.

The fifth transmission element MT20 may be coupled between the fifth photodiode PD20 and the second floating diffusion node FD2. The fifth transmission element MT20 may selectively couple the fifth photodiode PD20 to the second floating diffusion node FD2 based on a fifth transmission control signal TX20 of second row control signals. The sixth transmission element MT21 may be coupled between the sixth photodiode PD21 and the second floating diffusion node FD2. The sixth transmission element MT21 may selectively couple the sixth photodiode PD21 to the second floating diffusion node FD2 based on a sixth transmission control signal TX21 of the second row control signals. The seventh transmission element MT22 may be coupled between the seventh photodiode PD22 and the second floating diffusion node FD2. The seventh transmission element MT22 may selectively couple the seventh photodiode PD22 to the second floating diffusion node FD2 based on a seventh transmission control signal TX22 of the second row control signals. The eighth transmission element MT23 may be coupled between the eighth photodiode PD23 and the second floating diffusion node FD2. The eighth transmission element MT23 may selectively couple the eighth photodiode PD23 to the second floating diffusion node FD2 based on an eighth transmission control signal TX23 of the second row control signals.

Although not illustrated in the drawing, a second parasitic capacitor may be coupled to the second floating diffusion node FD2. The second parasitic capacitor may store charges generated from the fifth to eighth photodiodes PD20, PD21, PD22 and PD23.

The second reset element MR2 may be coupled between the high voltage terminal AVDD and the second floating diffusion node FD2. The second reset element MR2 may selectively couple the high voltage terminal to the second floating diffusion node FD2 based on a second reset control signal RX2 of the second row control signals.

The second driving element MD2 may be coupled between the high voltage terminal and the second selection element MS2. The second driving element MD2 may drive a second pixel signal VPX2 based on a voltage loaded onto the second floating diffusion node FD2.

The second selection element MS2 may be coupled between the second driving element MD2 and the first column line COL1. The second selection element MS2 may output the second pixel signal VPX2 to the first column line COL1 based on a second selection control signal SX2 of the second row control signals.

The relevant circuits MDCG1, MDCG2, MDCG3, CDCG1, CDCG2 and COL1 may be directly/indirectly coupled to the first and second unit pixel circuits UP1 and UP2. The relevant circuits MDCG1, MDCG2, MDCG3, CDCG1, CDCG2 and COL1 may include a first coupling circuit MDCG1, a second coupling circuit MDCG2, a third coupling circuit MDCG3, a first charge storage circuit CDCG1, a second charge storage circuit CDCG2 and the first column line COL1.

The first coupling circuit MDCG1 may selectively couple a dummy unit pixel circuit (not illustrated) to the first unit pixel circuit UP1 based on a first mode control signal VDCG1. For example, the first coupling circuit MDCG1 may electrically couple a dummy floating diffusion node (not illustrated) included in the dummy unit pixel circuit to the first floating diffusion node FD1 included in the first unit pixel circuit UP1 according to the low conversion gain mode, and electrically decouple or isolate the dummy floating diffusion node from the first floating diffusion node FD1 according to the high conversion gain mode.

The first coupling circuit MDCG1 may include a first gate capacitor having a MOS structure. Capacitance of the first gate capacitor may be adjusted according to the thickness of gate oxide of the first coupling circuit MDCG1. For example, the capacitance of the first gate capacitor may increase as the thickness of the gate oxide of the first coupling circuit MDCG1 decreases.

The second coupling circuit MDCG2 may selectively couple the first unit pixel circuit UP1 to the second unit pixel circuit UP2 based on a second mode control signal VDCG2. For example, the second coupling circuit MDCG2 may electrically couple the first floating diffusion node FD1 included in the first unit pixel circuit UP1 to the second floating diffusion node FD2 included in the second unit pixel circuit UP2 according to the low conversion gain mode, and electrically decouple or isolate the first floating diffusion node FD1 from the second floating diffusion node FD2 according to the high conversion gain mode.

The second coupling circuit MDCG2 may include a second gate capacitor having a MOS structure. Capacitance of the second gate capacitor may be adjusted according to the thickness of gate oxide of the second coupling circuit MDCG2. For example, the capacitance of the second gate capacitor may increase as the thickness of the gate oxide of the second coupling circuit MDCG2 decreases.

The third coupling circuit MDCG3 may selectively couple the second unit pixel circuit UP2 to a third unit pixel circuit (not illustrated) based on a third mode control signal VDCG3. For example, the third coupling circuit MDCG3 may electrically couple the second floating diffusion node FD2 included in the second unit pixel circuit UP2 to a third floating diffusion node (not illustrated) included in the third unit pixel circuit according to the low conversion gain mode, and electrically decouple or isolate the second floating diffusion node FD2 from the third floating diffusion node according to the high conversion gain mode.

The third coupling circuit MDCG3 may include a third gate capacitor having a MOS structure. Capacitance of the third gate capacitor may be adjusted according to the thickness of gate oxide of the third coupling circuit MDCG3. For example, the capacitance of the third gate capacitor may increase as the thickness of the gate oxide of the third coupling circuit MDCG3 decreases.

The first charge storage circuit CDCG1 may be coupled to a conductive line that couples the first coupling circuit MDCG1, the dummy floating diffusion node and the first floating diffusion node FD1 to each other. The first charge storage circuit CDCG1 may be a parasitic capacitor or a general capacitor, for example, a metal-insulator-metal (MIM) capacitor.

The second charge storage circuit CDCG2 may be coupled to a conductive line that couples the second coupling circuit MDCG2, the first floating diffusion node FD1 and the second floating diffusion node FD2 to each other. The second charge storage circuit CDCG2 may be a parasitic capacitor or a general capacitor, for example, a metal-insulator-metal (MIM) capacitor.

The first column line COL1 may be coupled in common to the first and second unit pixel circuits UP1 and UP2. The first column line COL1 may transfer the first pixel signal VPX1 to the signal converter 130 during the first row line time of the frame time, and transfer the second pixel signal VPX2 to the signal converter 130 during a second row line time of the frame time.

Hereinafter, examples of operation of the image sensing device 100, which has the above-described configuration, are described.

Figure 4:
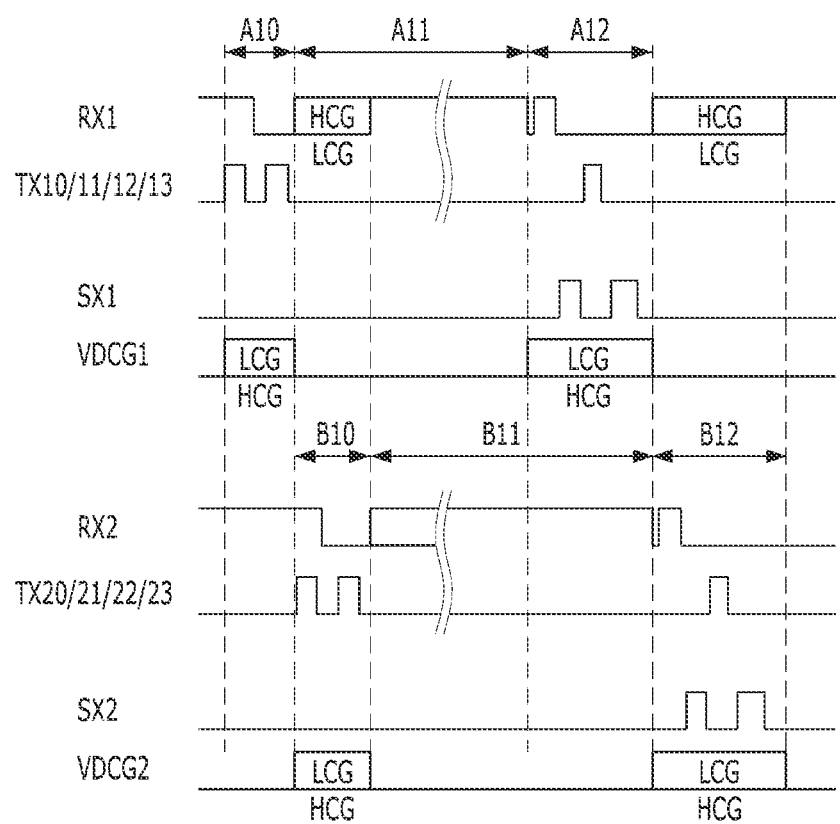
FIGS. 4 to 10 are timing diagrams illustrating examples of operation of an image sensing device, such as that illustrated in FIG. 1.

FIG. 4 is a timing diagram illustrating a method of controlling the image sensing device 100 according to the single mode. The single mode refers to a mode in which the image sensing device 100 operates according to one of the low conversion gain mode and the high conversion gain mode during the frame time.

Referring to FIG. 4, the image sensing device 100 may operate according to one of the low conversion gain mode and the high conversion gain mode during the frame time, and generate image data according to the one mode. The low conversion gain mode may be executed under a high illuminance condition. In other words, the low conversion gain mode may be executed when an average brightness value of a currently captured image is greater than a reference brightness value, that is, when the currently captured image is relatively bright. The high conversion gain mode may be executed in a low light condition. In other words, the high conversion gain mode may be executed when the average brightness value of the currently captured image is smaller than the reference brightness value, that is, when the currently captured image is relatively dark.

In addition, the image sensing device 100 may generate the first image data according to the low conversion gain mode during a first frame time, and then generate the second image data according to the high conversion gain mode during a second frame time. The image sensing device 100 may generate the high dynamic range image IMG based on the first and second image data generated during the first and second frame times.

FIG. 4 is described in more detail by taking the second unit pixel circuit UP2 as an example.

First, an operation of the second unit pixel circuit UP2 according to a low conversion gain mode LCG is described. The low conversion gain mode LCG may be executed when a currently captured image is relatively bright.

The second unit pixel circuit UP2 may reset the fifth to eighth photodiodes PD20, PD21, PD22 and PD23 and the second floating diffusion node FD2 based on the second reset control signal RX2 and the fifth to eighth transmission control signals TX20, TX21, TX22 and TX23 during a second reset time B10 of the second row line time. During the second reset time B10, the second mode control signal VDCG2 is activated, and thus the first and second floating diffusion nodes FD1 and FD2 may be electrically coupled by the second coupling circuit MDCG2, and the first reset control signal RX1 is deactivated so that the high voltage terminal AVDD and the first floating diffusion node FD1 may be electrically decoupled or isolated.

The second unit pixel circuit UP2 may generate charges through the fifth to eighth photodiodes PD20, PD21, PD22 and PD23 during a second exposure time B11 of the second row line time. For example, the second unit pixel circuit UP2 may generate the charges through the fifth to eighth photodiodes PD20, PD21, PD22 and PD23 during the second exposure time B11. The second reset control signal RX2 may be deactivated during an initial time of the second exposure time B11. The initial time may correspond to a third reset time of a third row line time (not illustrated).

The second unit pixel circuit UP2 may sequentially output a second reset signal and a second data signal as the second pixel signal VPX2 according to the second reset control signal RX2, the second selection control signal SX2 and the fifth to eighth transmission control signals TX20, TX21, TX22 and TX23 during a second readout time B12 of the second row line time. During the second readout time B12, the second mode control signal VDCG2 may be activated, and thus the first and second floating diffusion nodes FD1 and FD2 may be electrically coupled. Accordingly, during the second readout time B12, the total charge capacity of the second unit pixel circuit UP2 is equal to the sum of the capacitance of the second parasitic capacitor coupled to the second floating diffusion node FD2, the capacitance of the second charge storage circuit CDCG2, the capacitance of the second gate capacitor included in the second coupling circuit MDCG2, the capacitance of the first charge storage circuit CDCG1 and the capacitance of the first parasitic capacitor coupled to the first floating diffusion node FD1. Herein, at least one of the capacitance of the second charge storage circuit CDCG2, the capacitance of the second gate capacitor included in the second coupling circuit MDCG2 and the capacitance of the first charge storage circuit CDCG1 may be excluded from the total charge capacity according to design.

Next, an operation of the second unit pixel circuit UP2 according to a high conversion gain mode HCG is described. The high conversion gain mode HCG may be executed when a currently captured image is relatively dark.

The second unit pixel circuit UP2 may reset the fifth to eighth photodiodes PD20, PD21, PD22 and PD23 and the first floating diffusion node FD1 based on the second reset control signal RX2 and the fifth to eighth transmission control signals TX20, TX21, TX22 and TX23 during the second reset time B10 of the second row line time. During the second reset time B10, the second mode control signal VDCG2 may be deactivated, and thus the first and second floating diffusion nodes FD1 and FD2 may be electrically decoupled or isolated. The second unit pixel circuit UP2 may generate charges through the fifth to eighth photodiodes PD20, PD21, PD22 and PD23 during the second exposure time B11 of the second row line time. The second unit pixel circuit UP2 may generate a second reset signal, corresponding to the second reset control signal RX2, as the second pixel signal VPX2 during the second readout time B12 of the second row line time, and then generate a second data signal, corresponding to the fifth to eighth photodiodes PD20, PD21, PD22 and PD23, as the second pixel signal VPX2. During the second readout time B12, the second mode control signal VDCG2 may be deactivated, and thus the first and second floating diffusion nodes FD1 and FD2 may be electrically decoupled or isolated. Accordingly, during the second readout time B12, the total charge capacity of the second unit pixel circuit UP2 may be equal to the capacitance of the second parasitic capacitor coupled to the second floating diffusion node FD2.

Although an example in which the first unit pixel circuit UP1 is coupled to and used with the second unit pixel circuit UP2 when the second unit pixel circuit UP2 operates is described above, the present disclosure is not limited thereto; a plurality of unit pixel circuits adjacently arranged above and/or below a target unit pixel circuit may be coupled to and used with the target unit pixel circuit. For example, when the second unit pixel circuit UP2 operates, the first unit pixel circuit UP1 disposed above the second unit pixel circuit UP2 and the third unit pixel circuit disposed below the second unit pixel circuit UP2 may be coupled to and used with the second unit pixel circuit UP2.

FIGS. 5 to 10 are timing diagrams illustrating a method of controlling the image sensing device 100 according to the mixed mode. The mixed mode refers to a mode in which the image sensing device 100 operates according to the low conversion gain mode LCG and the high conversion gain mode HCG during the frame time.

Figure 5:
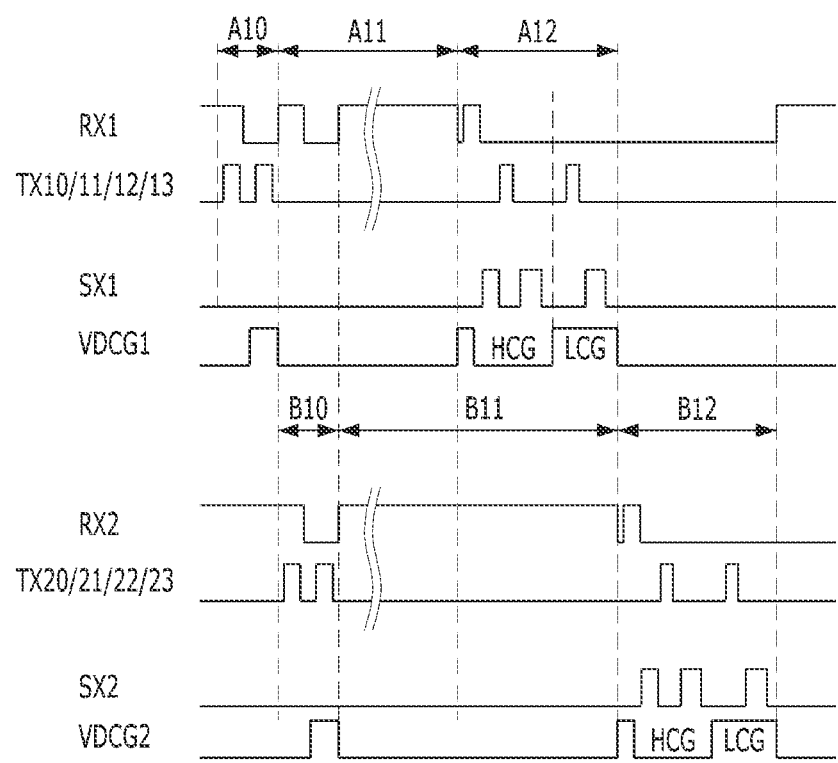

Referring to FIG. 5, the image sensing device 100 may operate according to the low and high conversion gain modes LCG and HCG during the frame time, and generate the first image data according to the low conversion gain mode LCG and the second image data according to the high conversion gain mode HCG. For example, during the frame time, the image sensing device 100 may generate the second image data corresponding to some charges generated from four photodiodes according to the high conversion gain mode HCG, and then generate the first image data corresponding to remaining charges generated from the four photodiodes according to the low conversion gain mode LCG. The image sensing device 100 may generate the high dynamic range image IMG based on the first and second image data generated during the frame time.

Figure 6:
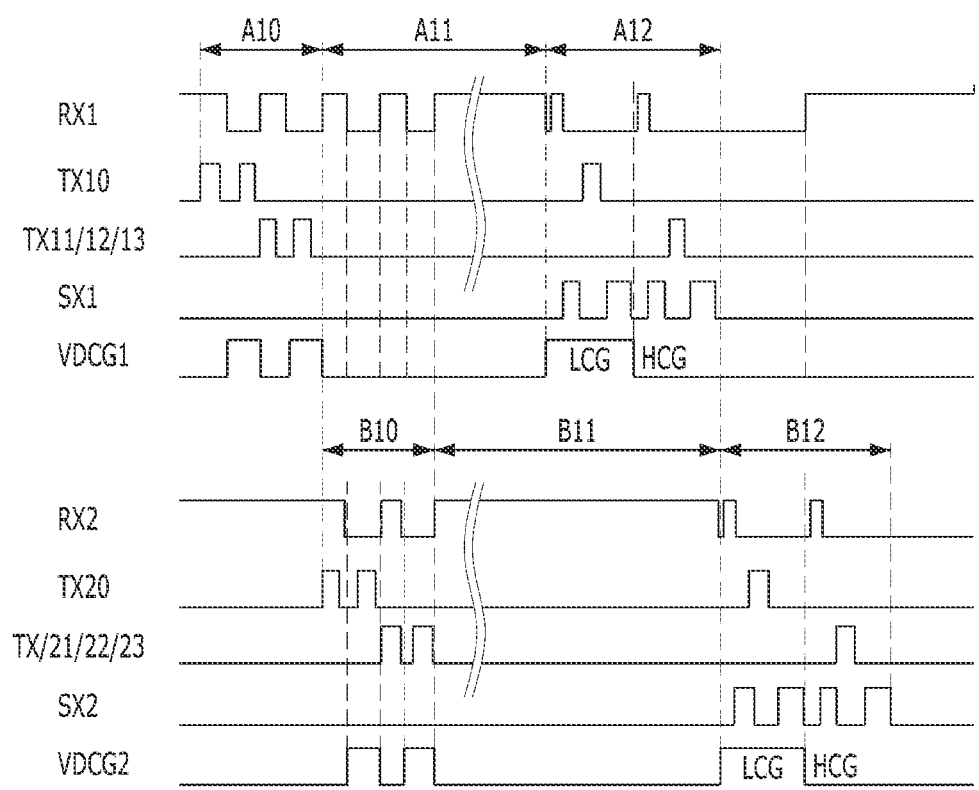

Referring to FIG. 6, the image sensing device 100 may operate according to the low and high conversion gain modes LCG and HCG during the frame time, and generate image data according to the low and high conversion gain modes LCG and HCG. For example, during the frame time, the image sensing device 100 may generate the first image data corresponding to charges generated from one photodiode according to the low conversion gain mode LCG, and then generate the second image data corresponding to charges generated from three photodiodes according to the high conversion gain mode HCG. The image sensing device 100 may generate the second image data with high sensitivity in the low illuminance condition by using the charges generated from three photodiodes in the high conversion gain mode HCG. The image sensing device 100 may generate the high dynamic range image IMG based on the first and second image data generated during the frame time.

Figure 7:
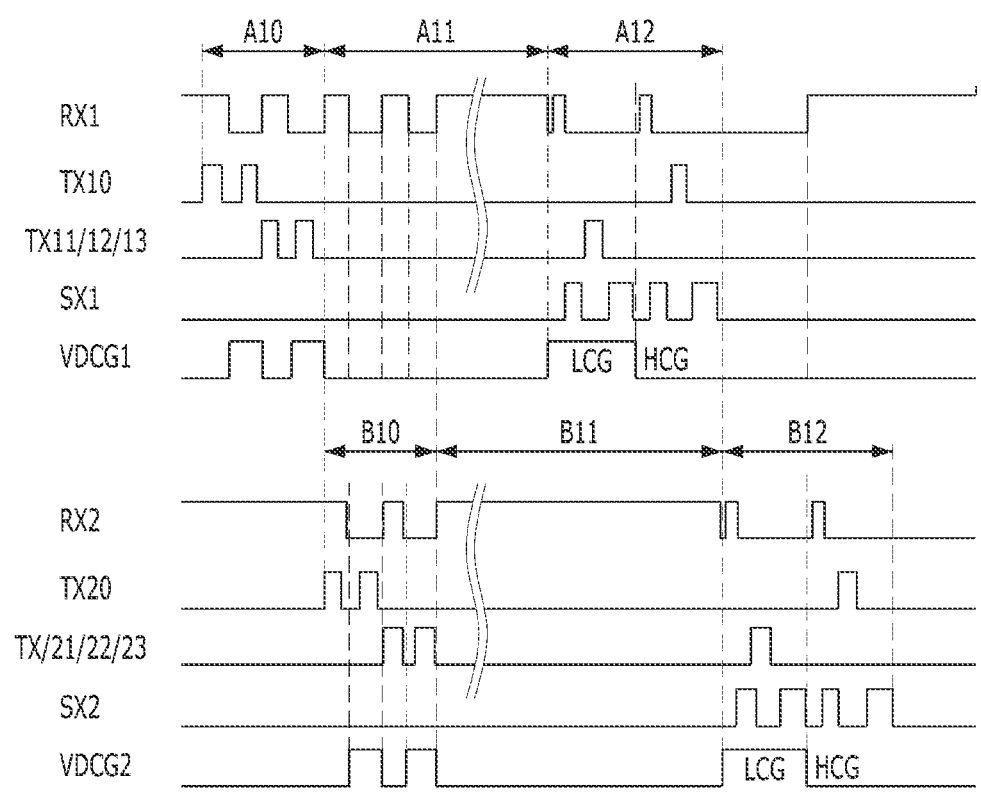

Referring to FIG. 7, the image sensing device 100 may operate according to the low and high conversion gain modes LCG and HCG during the frame time, and generate image data according to the low and high conversion gain modes LCG and HCG. For example, during the frame time, the image sensing device 100 may generate the first image data corresponding to charges generated from three photodiodes according to the low conversion gain mode LCG, and then generate the second image data corresponding to charges generated from one photodiode according to the high conversion gain mode HCG. The image sensing device 100 may generate the first and second image data with improved signal to noise ratio (SNR) by using the charges generated from the three photodiodes in the low conversion gain mode LCG and the charges generated from the one photodiode in the high conversion gain mode HCG. The image sensing device 100 may generate the high dynamic range image IMG based on the first and second image data generated during the frame time.

Figure 8:
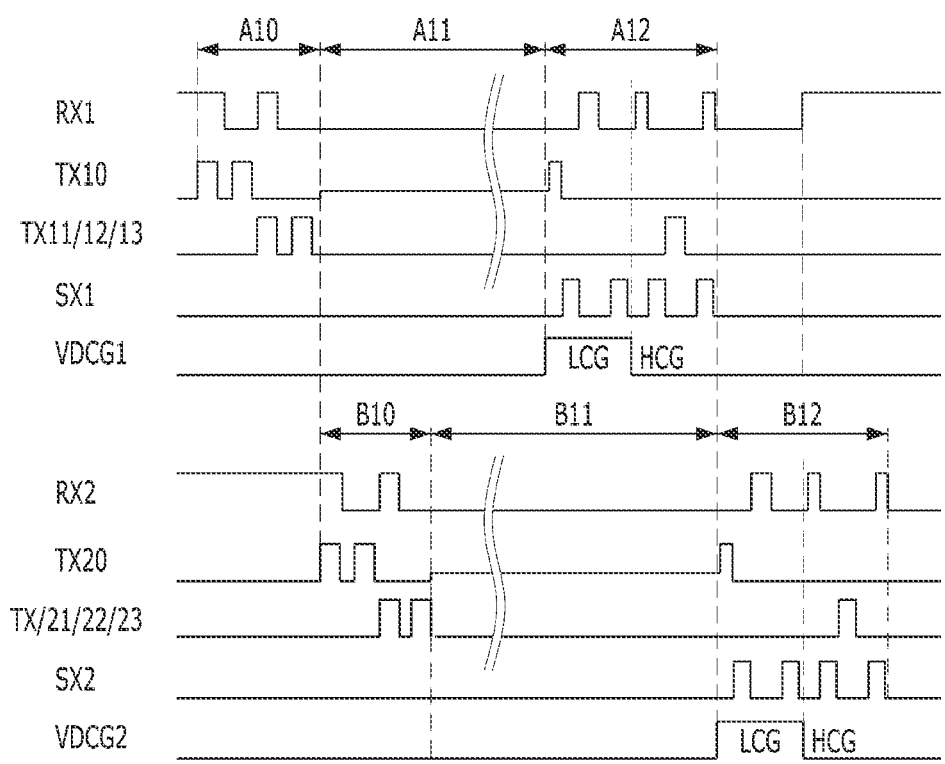

Referring to FIG. 8, the image sensing device 100 may operate according to the low and high conversion gain modes LCG and HCG during the frame time, and generate image data according to the low and high conversion gain modes LCG and HCG. For example, during the frame time, the image sensing device 100 may generate the first image data corresponding to charges generated from one photodiode according to the low conversion gain mode LCG, and then generate the second image data corresponding to charges generated from three photodiodes according to the high conversion gain mode HCG. Particularly, the image sensing device 100 may control a voltage level of the transmission control signal TX10 or TX20, which is related to the low conversion gain mode LCG, to be higher than an inactivation level of the transmission control signal TX10 or TX20 and lower than an activation level of the transmission control signal TX10 or TX20 during the corresponding exposure time A11 or B11, thereby transferring some of the charges generated from the photodiode PD10 or PD20 to the corresponding floating diffusion node FD1 or FD2 during the corresponding exposure time A11 or B11. In the low conversion gain mode LCG, the image sensing device 100 may transfer some charges, that is, charges of or greater than a set amount of charges (overflow charges), from the photodiode PD10 or PD20 in the low conversion gain mode LCG, to the corresponding floating diffusion node FD1 or FD2 in advance during the corresponding exposure time A11 or B11, thereby increasing the dynamic range of the first image data. The image sensing device 100 may generate the high dynamic range image IMG based on the first and second image data generated during the frame time.

As illustrated in FIG. 8, when generating the first image data according to the low conversion gain mode LCG, the image sensing device 100 may read out image data having a signal level according to the transmission control signal TX10 or TX20, and then read out image data having a reset level according to the reset control signal RX1 or RX2. When the image data having the signal level is first read out among the image data having the reset level and the image data having the signal level, the image sensing device 100 may use a delta sampling method.

Figure 9:
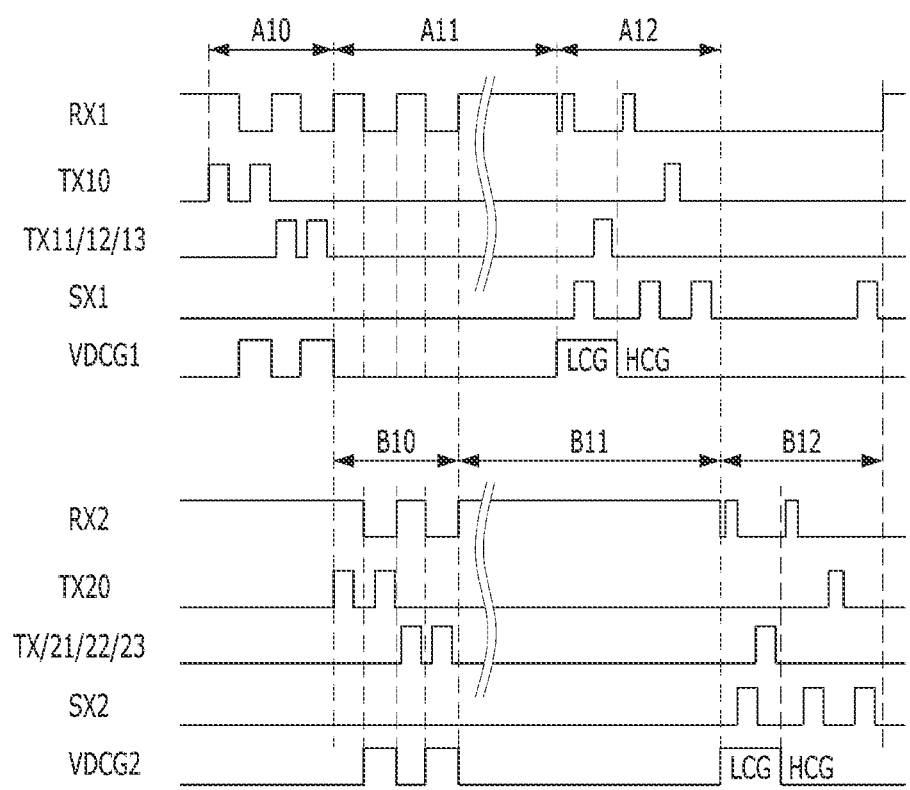

Referring to FIG. 9, the image sensing device 100 may operate according to the low and high conversion gain modes LCG and HCG during the frame time, and generate image data according to the low and high conversion gain modes LCG and HCG. For example, during the frame time, the image sensing device 100 may generate the first image data corresponding to charges generated from three photodiodes according to the low conversion gain mode LCG, and then generate the second image data corresponding to charges generated from one photodiode according to the high conversion gain mode HCG. Particularly, the image sensing device 100 may simultaneously read out image data having a signal level generated according to the low conversion gain mode LCG and image data having a signal level generated according to the high conversion gain mode HCG, thereby reducing the corresponding readout time A12 or B12. For example, the second unit pixel circuit UP2 may store the first image data having the signal level generated according to the low conversion gain mode LCG in the first floating diffusion node FD1 of the first unit pixel circuit UP1, store the second image data having the signal level generated according to the high conversion gain mode HCG in the second floating diffusion node FD2, and then simultaneously activate the first and second selection control signals SX1 and SX2, thereby simultaneously reading out the first image data having the signal level and the second image data having the signal level. The image sensing device 100 may generate the high dynamic range image IMG based on the first and second image data generated during the frame time.

Figure 10:
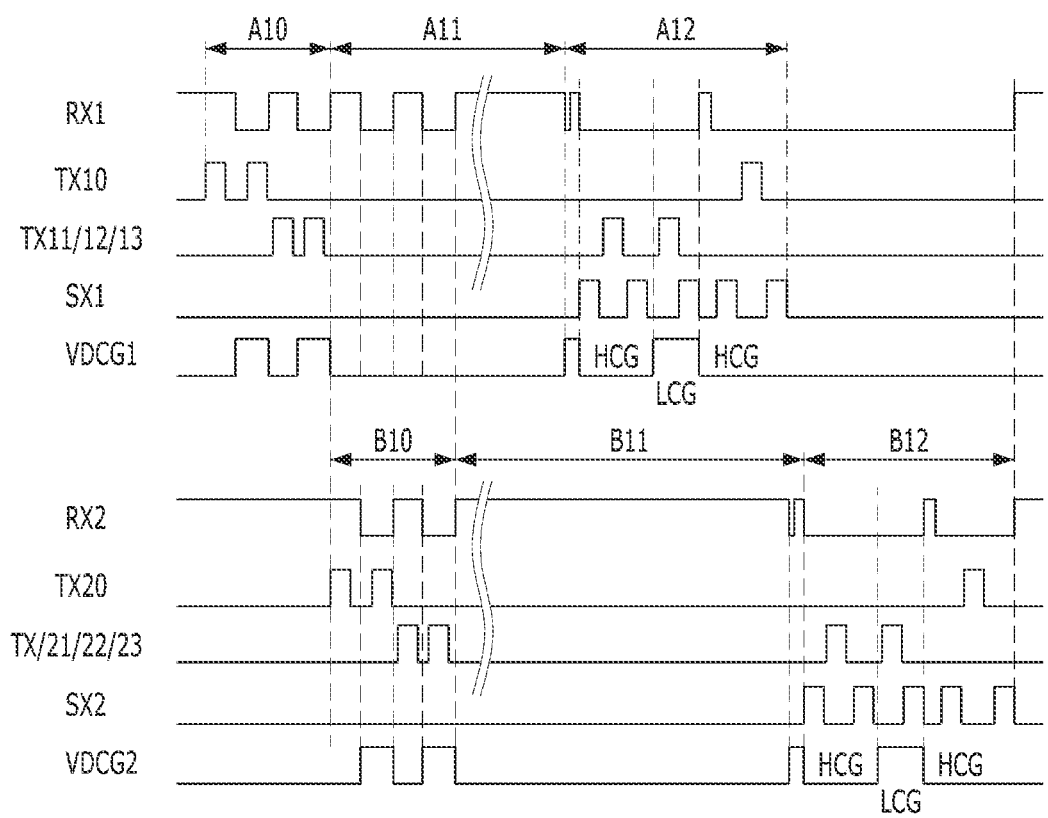

Referring to FIG. 10, the image sensing device 100 may operate according to the low and high conversion gain modes LCG and HCG during the frame time, and generate image data according to the low and high conversion gain modes LCG and HCG. For example, during the frame time, the image sensing device 100 may generate the first image data corresponding to charges generated from three photodiodes according to the high conversion gain mode HCG, generate the second image data corresponding to charges generated from three photodiodes according to the low conversion gain mode LCG, and then generate third image data corresponding to charges generated from one photodiode according to the high conversion gain mode HCG. The image sensing device 100 may have all the advantages of the embodiments of FIGS. 6 and 7 described above. In other words, the image sensing device 100 may generate the first image data with high sensitivity under the low illuminance condition and generate the second and third image data with improved signal-to-noise ratio (SNR). The image sensing device 100 may generate the high dynamic range image IMG based on the first to third image data generated during the frame time.

In accordance with embodiments of the present disclosure, it is possible to increase per pixel charge storing capacity by using neighboring pixels and control whether or not to increase the charge capacity according to a mode.

In accordance with embodiments of the present disclosure, it is possible to contribute to optimizing the size of a pixel by increasing per pixel charge storing capacity by using neighboring pixels.

In addition, in accordance with embodiments of the present disclosure, it is possible to optimize an operation for each mode by controlling whether or not to increase the charge capacity.

While the present disclosure has been illustrated and described with respect to specific embodiments, various changes and modifications may be made as those skilled in the art will recognize in light of the present disclosure. Thus, none of the disclosed embodiments nor any particular detail is intended to be restrictive. The present disclosure encompasses all variations that fall within the scope of the claims.

What is claimed is:

1. An image sensing device comprising:
a first unit pixel circuit disposed in a first row, including a first floating diffusion node, and suitable for outputting a first pixel signal through a column line;
a second unit pixel circuit disposed in a second row, including a second floating diffusion node, and suitable for outputting a second pixel signal through the column line;
a first coupling circuit suitable for selectively coupling the first floating diffusion node to the second floating diffusion node based on a first mode control signal;
a third unit pixel circuit disposed in a third row, including a third floating diffusion node, and suitable for outputting a third pixel signal through the column line; and
a second coupling circuit suitable for selectively coupling the second floating diffusion node to the third floating diffusion node based on a second mode control signal.

2. The image sensing device of claim 1, wherein the first coupling circuit electrically couples the first floating diffusion node to the second floating diffusion node during a low conversion gain period, and electrically isolates the first floating diffusion node from the second floating diffusion node during a high conversion gain period.

3. The image sensing device of claim 1, wherein the first coupling circuit includes a gate capacitor having a MOS structure.

4. The image sensing device of claim 1,
wherein the first unit pixel circuit includes a plurality of first photodiodes that share the first floating diffusion node, and
wherein the second unit pixel circuit includes a plurality of second photodiodes that share the second floating diffusion node.

5. The image sensing device of claim 1,
wherein the first coupling circuit electrically couples the first floating diffusion node to the second floating diffusion node during a low conversion gain period, and electrically isolates the first floating diffusion node from the second floating diffusion node during a high conversion gain period, and
wherein the second coupling circuit electrically couples the second floating diffusion node to the third floating diffusion node during the low conversion gain period, and electrically isolates the second floating diffusion node from the third floating diffusion node during the high conversion gain period.

6. The image sensing device of claim 1, wherein each of the first and second coupling circuits includes a gate capacitor having a MOS structure.

7. The image sensing device of claim 1,
wherein the first unit pixel circuit includes a plurality of first photodiodes that share the first floating diffusion node,
wherein the second unit pixel circuit includes a plurality of second photodiodes that share the second floating diffusion node, and
wherein the third unit pixel circuit includes a plurality of third photodiodes that share the third floating diffusion node.

8. An operating method of an image sensing device, comprising:
alternately operating each of a plurality of unit pixel circuits in a low conversion gain mode and a high conversion gain mode during a first frame time; and
alternately generating, by each of the unit pixel circuits, image data in accordance with the low conversion gain mode and image data in accordance with the high conversion gain mode, during the first frame time,
wherein the alternately operating includes operating in the high conversion gain mode, operating in the low conversion gain mode, and then operating in the high conversion gain mode, and
wherein the alternately generating includes generating first image data in accordance with the high conversion gain mode, generating second image data in accordance with the low conversion gain mode, and then generating third image data in accordance with the high conversion gain mode.

9. The operating method of claim 8, wherein the alternately operating includes electrically coupling a plurality of floating diffusion nodes, which are included in the plurality of unit pixel circuits, respectively, and disposed in a column, in the low conversion gain mode.

10. The operating method of claim 8, wherein the alternately operating includes electrically isolating the plurality of floating diffusion nodes in the high conversion gain mode.

11. The operating method of claim 8,
wherein the alternately operating includes operating in the high conversion gain mode, and then operating in the low conversion gain mode, and
wherein the alternately generating includes generating the image data in accordance with the high conversion gain mode, and then generating the image data in accordance with the low conversion gain mode.

12. The operating method of claim 8,
wherein the first image data is generated based on some charges generated from two or more of a plurality of photodiodes included in each of the unit pixel circuits,
wherein the second image data is generated based on remaining charges generated from the two or more photodiodes, and
wherein the third image data is generated based on charges generated from one of remaining photodiodes of the plurality of photodiodes.

13. The operating method of claim 8,
wherein the alternately operating includes operating in the low conversion gain mode, and then operating in the high conversion gain mode, and
wherein the alternately generating includes generating first image data in accordance with the low conversion gain mode, and then generating second image data in accordance with the high conversion gain mode.

14. The operating method of claim 13,
wherein the first image data is generated based on charges generated from any one of a plurality of photodiodes in each of the unit pixel circuits, and
wherein the second image data is generated based on charges generated from the other photodiodes.

15. The operating method of claim 13,
wherein the first image data is generated based on charges generated from two or more of a plurality of photodiodes included in each of the unit pixel circuits, and
wherein the second image data is generated based on charges generated from each of the other photodiodes.

16. The operating method of claim 8,
wherein the alternately operating includes operating in the low conversion gain mode, and then operating in the high conversion gain mode,
wherein the alternately generating includes generating first image data in accordance with the low conversion gain mode, and then generating second image data in accordance with the high conversion gain mode, and
wherein the alternately operating further includes transferring, by each of the unit pixel circuits, some charges, which are generated from a plurality of photodiodes during a corresponding exposure time, to a corresponding floating diffusion node based on a corresponding transmission control signal.

* * * * *